United States Patent Office 3,506,671
Patented Apr. 14, 1970

3,506,671
1-NAPHTHYLALKYL-4-PHENYLPIPERIDINE
DERIVATIVES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Nov. 1, 1967, Ser. No. 679,655
Int. Cl. C07d 29/24, 29/16; A61k 27/00
U.S. Cl. 260—294.7                              7 Claims

ABSTRACT OF THE DISCLOSURE

1 - naphthylalkyl - 4 - phenylpiperidines in which the naphthalene nucleus may have chloro, methyl or methoxy substituents, the phenyl group may be chloro, bromo, fluoro, methyl, trifluoromethyl or methoxy substituted and the piperidine ring is 4-hydroxy substituted are useful as tranquilizers. The compounds are generally prepared by condensation of a 4 - phenyl - 4 - piperidinol with a naphthalene-alkanoic acid or reactive derivative of the acid. The corresponding 4-acyloxy piperidines have analgetic activity and the dehydrated 1,2,5,6-tetrahydropyridines have tranquilizing activity.

This invention relates to novel 1-naphthylalkyl-4-phenylpiperidine derivatives having useful pharmacodynamic activity. More specifically the compounds of this invention tranquilizing and analgetic activity as demonstrated in standard animal pharmacological test procedures.

One group of compounds which is part of this invention is represented by the following general structural formula:

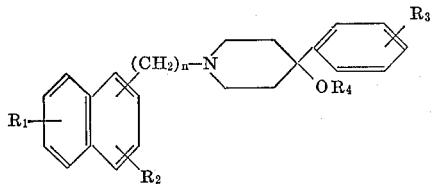

FORMULA I in which:
  $R_1$ represents hydrogen, chloro, methyl or methoxy;
  $R_2$ represents hydrogen or methyl;
  $R_3$ represents hydrogen, chloro, bromo, fluoro, methyl, trifluoromethyl or methoxy;
  $R_4$ represents hydrogen or

$R_5$ represents lower alkyl of up to 4 carbon atoms; and
  $n$ represents a positive whole integer of from 2 to 4.
Advantageous compounds are represented by the following formula:

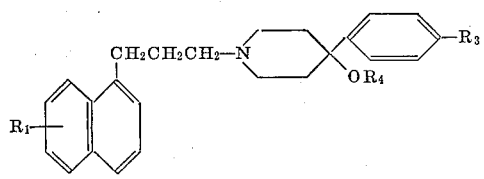

FORMULA II wherein $R_1$ is as defined above, preferably in positions 6 or 7; $R_3$ is as defined above; and $R_4$ is hydrogen, acetyl or propionyl.

Another group of compounds which is part of this invention is represented by the following general structural formula:

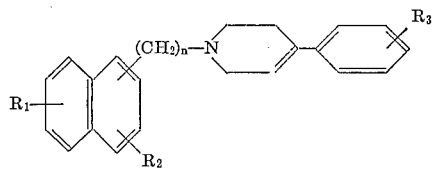

FORMULA III wherein $R_1$, $R_2$, $R_3$ and $n$ are as defined above for Formula I. Advantageous compounds are analogous to those of Formula II above.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, ascorbic, pamoic, succinic, bismethylenesalicylic, emthanesulfonic, ethanedisulfonic, acetic, propionic, tartaric, salicylic,, citric, gluconic, lactic, malic, mandelic, cinnamic, citraconic, aspartic, stearic, palmitic, itaconic, glycolic, p-aminobenzoic, glutamic, benzenesulfonic, hydrochloric, hydrobromic, sulfuric, sulfamic, phosphoric and nitric acids.

The compounds of the invention are generally prepared by condensation of a 4-phenyl-4-piperidinol with a naphthalenealkanoic acid. Preferably a reactive derivative of the acid is employed such as an acid halide, for example a chloride, a mixed (carboxylic-carbonic) anhydride or a diazoketone. The process is schematically represented as follows:

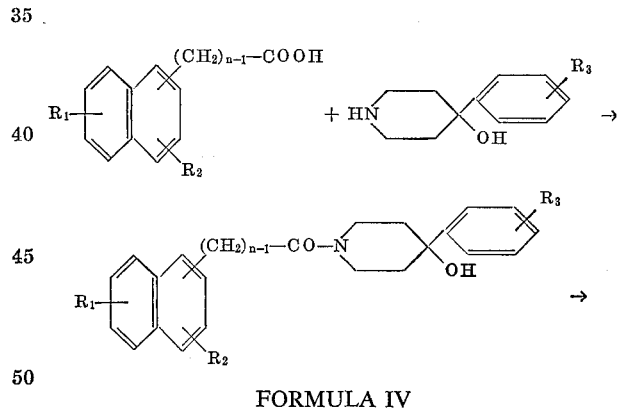

FORMULA IV

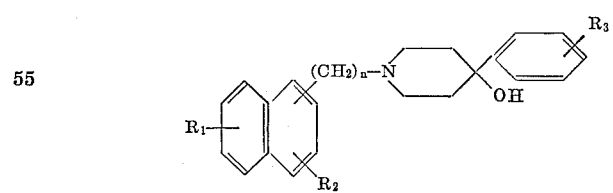

in which $R_1$, $R_2$, $R_3$ and $n$ are defined in Formula 1. As shown above the condensation gives the amide intermediates of Formula IV which also constitute a part of this invention. The 4-piperidinol products are obtained by reduction of the amides with a bimetallic hydride such as lithium aluminum hydride in a solvent such as ether or tetrahydrofuran.

The compounds of Formula I wherein $R_4$ is lower alkanoyl

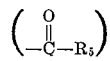

are prepared by acylating the corresponding hydroxy compound in the conventional manner with an anhydride or acyl halide such as acetic anhydride, propionyl chloride or butyryl chloride.

Compounds of Formula III, which are 1,2,5,6-tetrahydropyridines, are prepared by dehydration of the corresponding 4-piperidinols with, for example, refluxing concentrated hydrochloric acid.

The naphthalenealkanoic acid starting materials used as described herein are either known or are prepared by methods known in the art. Thus naphthalene acetate acids ($n$ is 2) are prepared from halomethylnaphthalenes such as chloromethyl naphthalenes by reaction with an alkali metal cyanide such as sodium or potassium cyanide followed by hydrolysis with an alkali metal hydroxide such as sodium or potassium hydroxide.

The naphthalene propionic acids ($n$ is 3) are prepared from halomethyl napthalenes such as chloromethyl naphthalenes by condensation with diethyl malonate in the presence of a base such as sodium ethoxide or sodium hydride to give a substituted malonic ester which is hydrolyzed with aqueous alkali to the corresponding malonic acid. The latter is decarboxylated by heating at about 200–250° C. to yield the propionic acid derivative.

The homologous naphthalene butyric acids ($n$ is 4) are prepared from the corresponding propionic acids through the use of the Arndt-Eistert reaction. The propionic acid is converted to its acid halide, condensed wth diazomethane and the resulting diazoketone hydrolyzed with aqueous silver oxide to the butyric acid. Alternatively, the diazoketone is treated with a 4-phenyl-4-piperidinol in the presence of silver oxide to give an amide of Formula IV which is similarly reduced to the product.

The 4-phenyl-4-piperidinol starting materials used as described hereinabove are similarly known or prepared by methods known in the art. For example, a 4-phenyl-4-bromo-piperidine is hydrolyzed to the piperidinol.

The piperidinol compounds ($R_4$ is hydrogen) of Formulas I and II and the tetrahydropyridine compounds of Formula III have tranquilizing activity, as demonstrated by decreased motor activity observed in rats upon oral administration in amounts of 25–100 mg./kg. The ester compounds ($R_4$ is alower alkanoyl) of Formulas I and II have analgetic activity, as demonstrated by nociceptive stimulation (tail pinch) in rats upon oral administration of 25–50 mg./kg.

The compounds of this invention may be administered orally or parenterally in conventional dosage unit forms such as tablets, capsules, injectables or the like, by incorporating the appropriate dose of a compound of Formula I, II or III with carriers according to accepted pharmaceutical practices.

The foregoing is a general description of how to prepare the compounds of this invention. The following examples illustrate the preparation of specific compounds having tranquilizing and analgetic activity. Appropriate variations in the starting materials will produce other corresponding products set forth hereinabove.

EXAMPLE 1

A mixture of 23.7 g. of a 57% suspension of sodium hydride in mineral oil and 350 ml. of dimethylsulfoxide is stirred at room temperature while 90.5 g. of diethyl malonate is added dropwise. The resulting mixture is stirred at 60–70° C. for one hour, cooled and a solution of 50.0 g. of 1-chloromethylnaphthalene in 100 ml. of dimethylsulfoxide is added dropwise. This solution is stirred on a steam bath for one hour, cooled and poured into ice-water. The extract obtained by ether extraction is evaporated in vacuo and the residue distilled to give diethyl (1-naphthylmethyl)-malonate, B.P. 162–174° C./0.3 mm.

The above malonate dissolved in 600 ml. of alcohol and a solution of 52.5 g. of potassium hydroxide in 100 ml. of water are stirred and refluxed for one and one-half hours. The reaction mixture is evaporated in vacuo and the residue is dissolved in water, washed with ether, acidified with concentrated hydrochloric acid and extracted with ether. The extract is washed with water and a saturated solution of sodium chloride, dried and evaporated in vacuo to give (1-naphthylmethyl)-malonic acid, M.P. 170–172° C.

The above malonic acid (15.0 g.) is heated in an oil bath to 240° C. and maintained at 200–220° C. for one hour to give 3-(1-naphthyl)-propionic acid, M.P. 136–155° C. To this acid is added 30 ml. of thionyl chloride and, after standing at room temperature overnight, the solution is evaporated in vacuo to give the acid chloride. The latter is dissolved in 250 ml. of dry toluene and then added to a suspension of 20.3 g. of 4-phenyl-4-piperidinol in 250 ml. of dry toluene. The mixture is stirred and refluxed for two hours, allowed to stand overnight at room temperature and filtered. The filtrate is washed with dilute hydrochloric acid, sodium hydroxide, water and saturated sodium chloride solution, dried and evaporated in vacuo to yield 1-[3-(1-naphthyl)-propionyl]-4-phenyl-4-piperidinol.

To a mixture of 5.7 g. of lithium aluminum hydride in 1 l. of dry ether is added a solution of the above-prepared amide in 100 ml. of dry tetrahydrofuran. The resulting mixture is refluxed for one hour, cooled, decomposed in the usual manner and filtered. The filtrate is evaporated in vacuo to give the free base product. A solution of the free base in ethanol is acidified with ethereal hydrogen chloride. Dilution with ether and filtration gives the hydrochloride salt of the product, 1-[3-(1-naphthyl)-propyl]-4-phenyl-4-piperidinol, M.P. 223–226° C.

EXAMPLE 2

A mixture of 13 g. of 3-(2-naphthyl)-propionic acid and 35 ml. of thionyl chloride is allowed to stand overnight at room temperature. The reaction mixture is diluted with benzene and evaporated in vacuo to give the acid chloride, M.P. 61–64° C.

To a solution of 21.9 g. of 4-phenyl-4-piperidinol in 400 ml. of dry toluene is added a solution of 13.7 g. of the above acid chloride in 100 ml. of dry toluene. The mixture is stirred and refluxed for two hours, cooled and filtered. The filtrate is washed, dried and evaporated in vacuo to give 1-[3-(2-naphthyl)-propionyl]-4-phenyl-4-piperidinol, M.P. 116–128° C.

The above prepared amide dissolved in 100 ml. of dry tetrahydrofuran is added slowly to a mixture of 5.7 g. of lithium aluminum hydride in 1 l. of dry ether. The resulting mixture is stirred and refluxed for two hours, allowed to stand at room temperature overnight, decomposed as usual and filtered. The filtrate is evaporated in vacuo to yield 1 - [3-(2-naphthyl)-propyl]-4-phenyl-4-piperidinol, M.P. 148–151° C.; hydrochloride salt, M.P. 194–196° C.

EXAMPLE 3

A mixture of 23.7 g. of a 57% suspension of sodium hydride in mineral oil and 350 ml. of dimethylsulfoxide is stirred at room temperature while 90.5 g. of diethyl malonate is added dropwise. The resulting mixture is stirred at 60–70° C. for one hour, cooled to room temperature and a solution of 54.0 g. of 1-chloromethyl-2-methylnaphthalene in 400 ml. of dimethylsulfoxide is added slowly. The reaction mixture is stirred and heated on the steam bath for one and one-half hours, cooled to room temperature, poured into ice-water and extracted with ether. The ether extract is washed, dried and evaporated in vacuo. The residue is distilled to give diethyl (2-methyl-1-naphthylmethyl)-malonate, B.P. 160–180° C./0.3 mm.

The above prepared malonate is dissolved in 1200 ml. of ethanol and a solution of 75.1 g. of potassium hydroxide in 150 ml. of water is added. The resulting mixture is refluxed for two hours and then evaporated in vacuo. The residue is dissolved in water, washed with ether and acidified. The acid solution is extracted with ether and the extract is washed, dried and evaporated to give (2-methyl-1-naphthylmethyl)-malonic acid, M.P. 194–195° C.

The above prepared malonic acid (13.0 g.) is heated in an oil bath of 260° C. for 10 minutes, then heated at 200° C. for one-half hour. The melt is allowed to cool yielding 3-(2-methyl-1-naphthyl)-propionic acid. Thinoyl chloride (30 ml.) is added and the mixture allowed to stand at room temperature overnight. Benzene is added and the solution is evaporated in vacuo to give the acid chloride. The latter, dissolved in toluene, is added to a mixture of 17.7 g. of 4-phenyl-4-piperidinol in 200 ml. of toluene. The resulting mixture is refluxed for two hours, cooled and filtered. The filtrate is washed, dried and evaporated in vacuo to give 1-[3-(2-methyl-1-naphthyl)-propionyl]-4-phenyl - 4 - piperidinol, M.P. 124–131° C.

To a suspension of 5.7 g. of lithium aluminum hydride in 1 l. of dry ether is added a solution of 18.4 g. of the above-prepared amide in 150 ml. of dry tetrahydrofuran and the mixture is stirred and refluxed for two hours. After standing overnight at room temperature the reaction mixture is decomposed in the usual manner, filtered and the filtrate evaporated in vacuo. The residual product is dissolved in ethanol, acidified with ethereal hydrogen chloride and diluted with ether to give the hydrochloride salt, M.P. 148–154° C. A solution of the hydrochloride in aqueous methanol is made basic with sodium hydroxide solution and the free base extracted into ether. The dried extract is evaporated to yield 1-[3-(2-methyl-1-naphthyl) - propyl]-4-phenyl-4-piperidinol, M.P. 95–97° C.

Similarly, use of 1-chloromethyl-4-methylnaphthalene as described above results in the formation of 1-[3-(4-methyl-1-naphthyl)-propyl]-4-phenyl-4-piperidinol.

EXAMPLE 4

A mixture of 7.5 g. of 1-[3-(1-naphthyl)-propyl]-4-phenyl-4-piperidinol hydrochloride (prepared as in Example 1) and 100 ml. of concentrated hydrochloric acid is stirred for three hours on the steam bath and then allowed to stand overnight at room temperature. Methanol is added and the solution is evaporated in vacuo. The residue is dissolved in methanol, diluted with benzene and evaporated in vacuo. Benzene is added and the mixture evaporated in vacuo to yield the solid 1-[3-(1-naphthyl)-propyl]-4-phenyl-1,2,5,6 - tetrahydropyridine hydrochloride, M.P. 195–197° C. The free base is obtained in the usual manner.

Similarly, dehydration by the above procedure of other piperidinols of this invention yields the corresponding tetrahydropyridines.

EXAMPLE 5

Following the procedure of Example 1, 3-(1-naphthyl)-propionic acid is converted to the acid chloride and then condensed with 4-(p-chlorophenyl)-4-piperidinol to give an amide which is reduced with lithium aluminum hydride to give the product, 1-[3-(1-naphthyl)-propyl]-4-(p-chlorophenyl)-4-piperidinol.

Similarly, use of 4-(p-tolyl)-4-piperidinol or 4-(p-trifluoromethylphenyl)-4-piperidinol as described above results in the formation of 1-[3-(1-naphthyl)-propyl]-4-(p-tolyl)-4-piperidinol or 1-[3-(1-naphthyl)-propyl]-4-(p-trifluoromethylphenyl)-4-piperidinol, respectively.

Use of 4-(m-bromophenyl)-4-piperidinol or 4-(o-tolyl)-4-piperidinol in the above procedure results in the formation of 1-[3-(1-naphthyl)-propyl]-4-(m-bromophenyl)-4-piperidinol or 1-[3-(1-naphthyl)-propyl]-4-(o-tolyl)-4-piperidinol, respectively.

Use of fluoro or methoxy substituted phenyl piperidinols results in the formation of the corresponding fluoro or methoxy substituted phenyl products.

EXAMPLE 6

Following the procedures of Examples 1, 2 or 3, 1-chloromethyl-6-methoxynaphthalene is condensed with sodio diethyl malonate to give diethyl (6-methoxy-1-naphthylmethyl)-malonate. The malonate is hydrolyzed to the diacid with aqueous potassium hydroxide, the diacid monodecarboxylated by heating and the corresponding acid chloride formed with thionyl chloride. The acid chloride is condensed with 4-(p-chlorophenyl)-4-piperidinol to give an amide which is reduced with lithium aluminum hydride to give the product, 1-[3-(6-methoxy-1-naphthyl)-propyl]-4-(p-chlorophenyl)-4-piperidinol.

Similarly, use of 1-chloromethyl-7-chloronaphthalene as described above results in the formation of 1-[3-(7-chloro-1-naphthyl)-propyl]-4-(p-chlorophenyl) - 4-piperidinol.

EXAMPLE 7

Following the procedures of Examples 1, 2 or 3, 1-naphthaleneacetic acid is converted to its acid chloride and then condensed with 4-phenyl-4-piperidinol to give 1-[2-(1-naphthyl)-acetyl]-4-phenyl-4-piperidinol which is reduced with lithium aluminum hydride to the product, 1-[2-(1-naphthyl)-ethyl]-4-phenyl-4-piperidinol.

Similarly, use of 1-naphthalenebutyric acid as described above results in the formation of 1-[4-(1-naphthyl)-butyl]-4-phenyl-4-piperidinol. Use of 6-methyl-1-naphthalenebutyric acid results in the formation of 1-[4-(6-methyl-1-naphthyl)-butyl]-4-phenyl-4-piperidinol.

EXAMPLE 8

A solution of 4.1 g. of 1-[3-(1-naphthyl)-propyl]-4-phenyl-4-piperidinol and 2 or 3 drops of concentrated sulfuric acid in 100 ml. of acetic anhydride is stirred on the steam bath for three hours and evaporated in vacuo. The residue is warmed and stirred with 5% sodium carbonate solution, then cooled and methylene chloride added. The organic layer is washed, dried and evaporated in vacuo to give 1-[3-(1-naphthyl)-propyl]-4-phenyl-4-piperidinol O-acetate.

EXAMPLE 9

To a solution of 6.7 g. of 1-[3-(1-naphthyl)-propyl]-4-phenyl-4-piperidinol in 200 ml. of dry benzene is added a solution of 1.8 g. of propionyl chloride in 50 ml. of dry benzene and the mixture is refluxed for one hour. After standing at room temperature overnight, the reaction mixture is filtered and the filtrate evaporated in vacuo to give 1-[3-(1-naphthyl)-propyl]-4-phenyl-4-piperidino O-propionate.

What is claimed is:

1. A chemical compound of the formula:

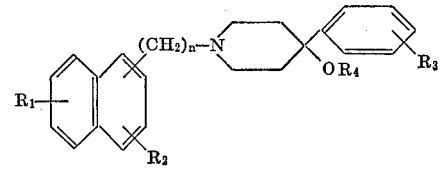

or a pharmaceutically acceptable acid addition salt thereof, wherein:
  $R_1$ is hydrogen, chloro, methyl or methoxy;
  $R_2$ is hydrogen or methyl;
  $R_3$ is hydrogen, chloro, bromo, fluoro, methyl, trifluoromethyl or methoxy;
  $R_4$ is hydrogen; and
  $n$ is a positive integer from 2 to 4.

2. A chemical compound according to claim 1 in which $R_2$ is hydrogen.

3. A chemical compound according to claim 2 in which $n$ is 3.

4. A chemical compound according to claim 3 in which the naphthalene moiety is 1-substituted.

5. A chemical compound according to claim 4 in which $R_1$ and $R_3$ are hydrogen.

6. A chemical compound according to claim 5 in which $R_4$ is hydrogen, being the compound 1-[3-(1-naphthyl)-propyl]-4-phenyl-4-piperidinol.

7. A chemical compound of the formula:

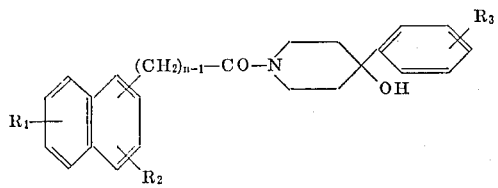

wherein:
$R_1$ is hydrogen, chloro, methyl or methoxy;
$R_2$ is hydrogen or methyl;
$R_3$ is hydrogen, chloro, bromo, fluoro, methyl, trifluoromethyl or methoxy; and
$n$ is a positive integer from 2 to 4.

References Cited

UNITED STATES PATENTS 2,973,363  2/1961  Janssen.

HENRY R. JILES, Primary Examiner
S. D. WINTERS, Assistant Examiner

U.S. Cl. X.R.

260—294.3, 290, 515, 293.4, 294.8, 294, 295; 424—263, 267